US008674952B2

(12) United States Patent  
Kao et al.

(10) Patent No.: US 8,674,952 B2
(45) Date of Patent: Mar. 18, 2014

(54) TOUCH DISPLAY PANEL, PIXEL STRUCTURE AND MULTI-SENSING STRUCTURE

(75) Inventors: Kuo-Feng Kao, Taipei County (TW); Che-Cheng Kuo, Taoyuan County (TW); Zeng-De Chen, Yunlin County (TW); Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 702 days.

(21) Appl. No.: 12/726,351

(22) Filed: Mar. 18, 2010

(65) Prior Publication Data

US 2011/0134053 A1 Jun. 9, 2011

(30) Foreign Application Priority Data

Dec. 9, 2009 (TW) ............................... 98142139 A

(51) Int. Cl.
*G06F 3/041* (2006.01)
(52) U.S. Cl.
USPC ........................................................ 345/173
(58) Field of Classification Search
USPC ................... 345/173, 174; 349/12, 139, 155; 178/18.03–18.07
See application file for complete search history.

(56) References Cited

U.S. PATENT DOCUMENTS

| 6,501,529 | B1 * | 12/2002 | Kurihara et al. | 349/160 |
| 2007/0070051 | A1 * | 3/2007 | Westerman et al. | 345/173 |
| 2008/0100590 | A1 * | 5/2008 | Hur et al. | 345/173 |
| 2009/0002312 | A1 * | 1/2009 | Son | 345/104 |
| 2009/0174832 | A1 * | 7/2009 | Lee | 349/43 |
| 2010/0156819 | A1 * | 6/2010 | Takahashi et al. | 345/173 |
| 2010/0156827 | A1 * | 6/2010 | Joo et al. | 345/173 |
| 2010/0231548 | A1 * | 9/2010 | Mangione-Smith et al. | 345/174 |
| 2011/0063233 | A1 * | 3/2011 | Chuang et al. | 345/173 |

FOREIGN PATENT DOCUMENTS

| CN | 101261562 | 9/2008 |
| CN | 101593069 | 12/2009 |
| JP | 2007052369 | 3/2007 |

OTHER PUBLICATIONS

"First Office Action of China Counterpart Application", issued on Jan. 17, 2011, p. 1-p. 4, in which the listed reference was cited.
"Second Office Action of China Counterpart Application", issued on Aug. 31, 2011, p. 1-p. 6, in which the listed reference was cited.

* cited by examiner

*Primary Examiner* — Pegeman Karimi
(74) *Attorney, Agent, or Firm* — Jianq Chyun IP Office

(57) ABSTRACT

A touch display panel which includes a first substrate, a second substrate, at least a multi-sensing structure, a display medium and at least a display controlling device is provided. The multi-sensing structure is disposed between the first substrate and the second substrate, and the multi-sensing structure includes a sensing upper electrode and a plurality of first sensing lower electrodes. The sensing upper electrode is disposed on the second substrate. The first sensing lower electrodes are disposed on the first substrate and electrically connected to each other in series, wherein a plurality of first sensing gaps are designed between the first sensing lower electrodes and the sensing upper electrode, and the first sensing gaps have different distances. The display medium is sandwiched between the first substrate and the second substrate. The display controlling device is disposed on the first substrate for controlling the display medium.

8 Claims, 8 Drawing Sheets

TOUCH DISPLAY PANEL, PIXEL STRUCTURE AND MULTI-SENSING STRUCTURE

CROSS-REFERENCE TO RELATED APPLICATION

This application claims the priority benefit of Taiwan application serial no. 98142139, filed on Dec. 9, 2009. The entirety of the above-mentioned patent application is hereby incorporated by reference herein and made a part of specification.

BACKGROUND OF THE INVENTION

1. Field of the Invention

The present invention generally relates to a display panel, and more particularly, to a touch display panel and a pixel structure and a multi-sensing structure which are used in the touch display panel.

2. Description of Related Art

In recent years, touch display panels have been widely applied to all sorts of electronic products, for example global positioning systems (GPSs), PDAs, cellular phones and hand-held personal computers, so as to replace conventional input devices (for example keyboards and mice). This drastic change in design not only enhances the friendliness of the human-machine interfaces of the electronic devices, but also provides more space due to the omission of the conventional input devices, so that the user browses information more conveniently.

At this current stage, touch display panels can be categorized, based on the manner in which they are driven and structural designs, into externally-attached resistive touch display panels and internally-embedded resistive touch display panels. For internally-embedded resistive touch display panel technologies, touch functions are directly integrated into manufacturing processes of the panels. An additional layer of touch glass or conductive thin film is not required. Therefore, the internally-embedded resistive touch display panel has advantages of thinner, lighter and better transmittance.

Currently, the internally-embedded resistive touch display panel is usually formed by respectively forming a sensing upper electrode and a sensing lower electrode on the two substrates, and a sensing gap is between the sensing upper electrode and the sensing lower electrode. When a touch operation is performed by applying a pressure on the touch display panel, the sensing upper electrode electrically contacts with the sensing lower electrode. By using the control unit to read out the signals on the upper and lower sensing electrodes, the X and Y coordinates of the position on the touch display panel on which the fingers or objects press against are detected. However, the touch function which is achieved by pressing the touch display panel with the fingers or objects may be affected by the process quality of the touch display panel, so as to influence the touch quality of the touch display panel. For details, the process quality or variation of the touch display panel may lead the touch display panel to have larger or excessively large sensing gap or have smaller or excessively small sensing gap. If the touch display panel has a larger or excessively large sensing gap, a larger touch pressure is required to perform the touch operation, and thereby the touch display panel has lower sensing sensitivity. If the touch display panel has a smaller or excessively small sensing gap sensing gap, an error sensing signal may be generated even the touch operation is not performed, and thereby the touch display panel has excessively high sensing sensitivity.

SUMMARY OF THE INVENTION

The present invention is directly to a touch display panel and a pixel structure and a multi-sensing structure used in the touch display panel, which are capable of resolving the touch sensing sensitivity affected by the process quality or variation of the touch display panel in the prior art.

A touch display panel which includes a first substrate, a second substrate, at least a multi-sensing structure, a display medium and at least a display controlling device is provided. The multi-sensing structure is disposed between the first substrate and the second substrate, and the multi-sensing structure includes a sensing upper electrode and a plurality of first sensing lower electrodes. The sensing upper electrode is disposed on the second substrate. The first sensing lower electrodes are disposed on the first substrate and electrically connected to each other in series, wherein a plurality of first sensing gaps are between the first sensing lower electrodes and the sensing upper electrode, and the first sensing gaps have different distances. The display medium is sandwiched between the first substrate and the second substrate. The display controlling device is disposed on the first substrate for controlling the display medium.

A pixel structure having a first substrate and a second substrate opposite to the first substrate is provided. The pixel structure includes at least one scan line, at least one data line, at least one active device, at least one pixel electrode and a multi-sensing structure. The scan line and the data line are disposed on the first substrate. The active device is disposed on the first substrate and electrically connected to the scan line and the data line. The pixel electrode is disposed on the first substrate and electrically connected to the active device. The multi-sensing structure is disposed between the first substrate and the second substrate, and the multi-sensing structure includes a sensing upper electrode and a plurality of first sensing lower electrodes. The sensing upper electrode is disposed on the second substrate. The first sensing lower electrodes are disposed on the first substrate and electrically connected to each other in series, wherein a plurality of first sensing gaps are between the first sensing lower electrodes and the sensing upper electrode, and the first sensing gaps have different distances.

A multi-sensing structure which includes a sensing upper electrode and a plurality of sensing lower electrodes is also provided. The first sensing lower electrodes are disposed opposite to the sensing upper electrode and electrically connected to each other in series, wherein a plurality of first sensing gaps are between the first sensing lower electrodes and the sensing upper electrode, and the first sensing gaps have different distances.

According to the aforementioned, the multi-sensing structure has a plurality of first sensing gaps between the first sensing lower electrodes and the sensing upper electrode, and the first sensing gaps have different distances. The number of the first sensing lower electrodes contacting with the sensing upper electrode is varied according to the touch pressure. Therefore, the sensing sensitivity of the touch display panel can be adjusted based on the measured sensing signals, so as to improve the quality of the touch display panel.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
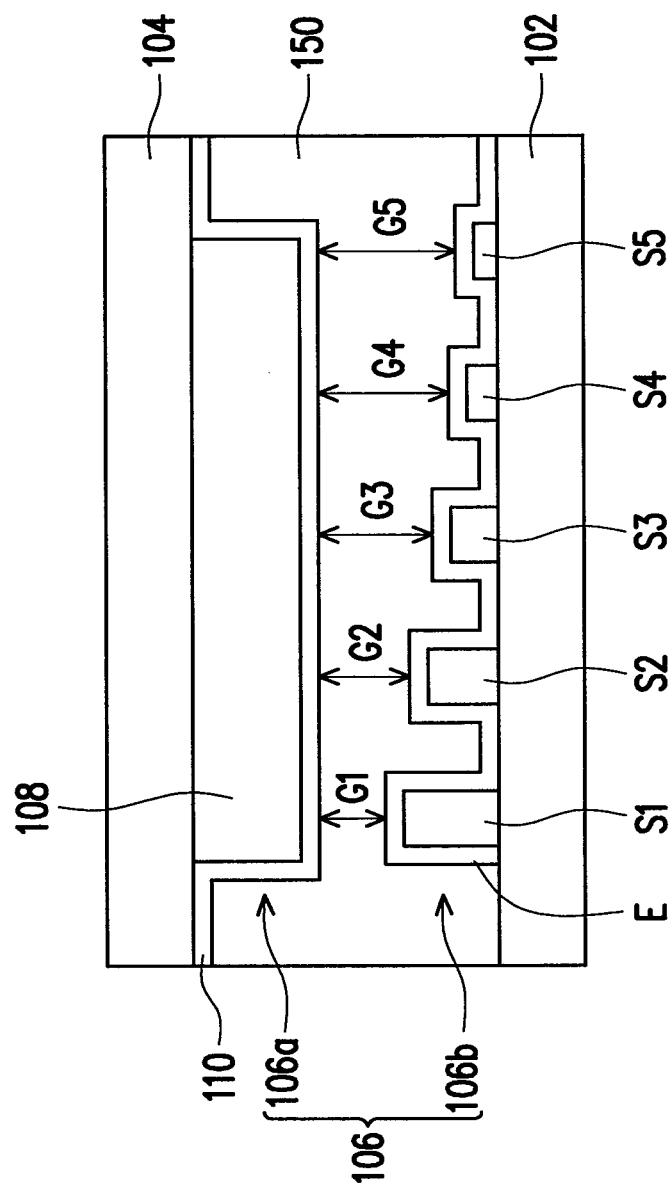
FIG. 1 is a cross-sectional view illustrating a portion of a touch display panel according to an embodiment of the present invention.
Figure 2:
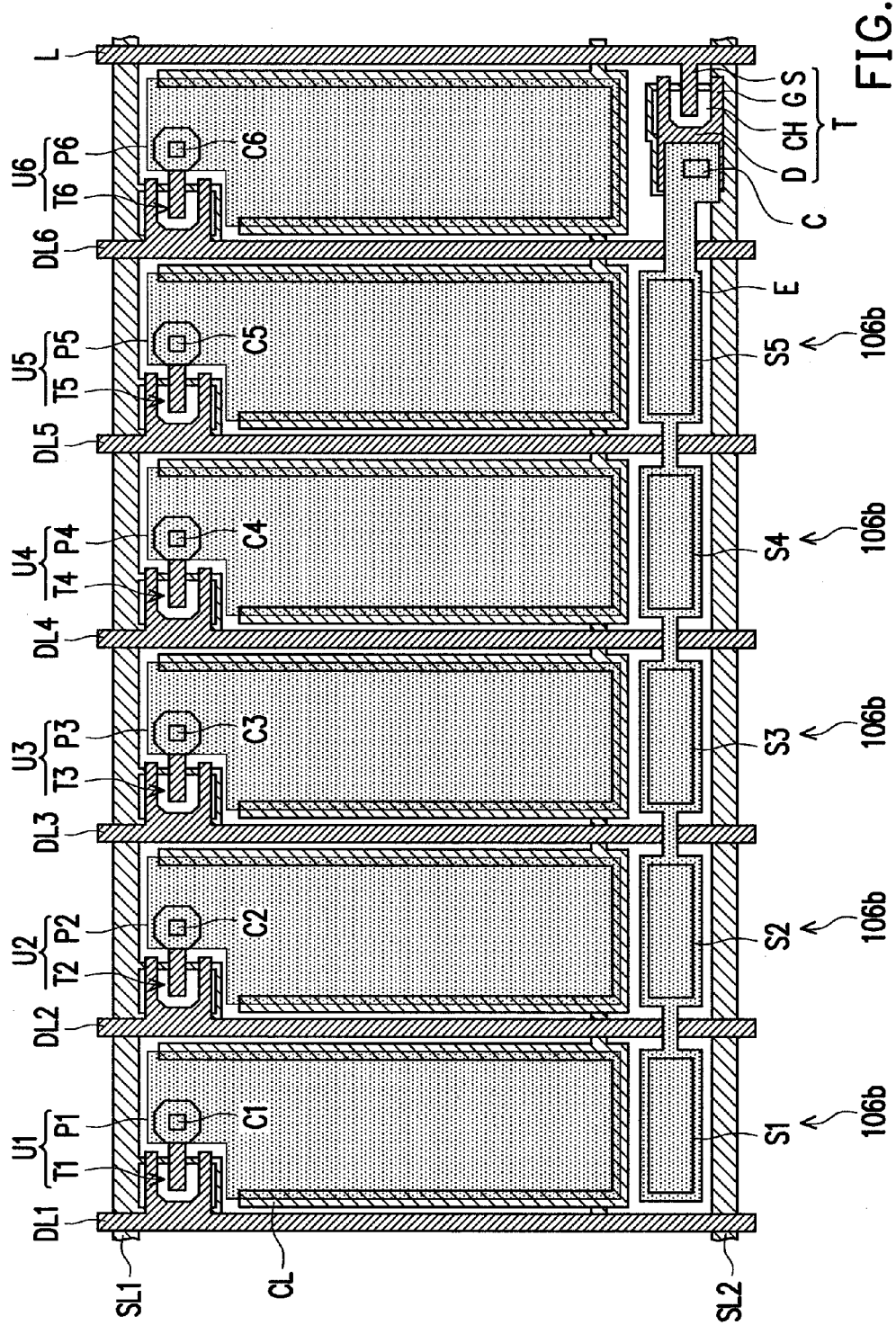
FIG. 2 is a partial top view of the first substrate of the touch display panel of FIG. 1.

FIG. 1 is a cross-sectional view illustrating a portion of a touch display panel according to an embodiment of the present invention, FIG. 2 is a partial top view of the first substrate of the touch display panel of FIG. 1, and the cross-sectional view of FIG. 1 is corresponding to FIG. 2 in which a multi-sensing structure is disposed. Referring to FIG. 1 and FIG. 2, the touch display panel of the embodiment includes a first substrate 102, a second substrate 104, at least a multi-sensing structure 106, a display medium 150 and at least a display controlling device U1~U6.

The first substrate 102 is an active device array substrate, for example, and comprises a plurality of display controlling devices U1~U6, scan lines SL1, SL2 and data lines DL1~DL6. The scan lines SL1, SL2 and two of the adjacent data lines DL1~DL6 define a sub-pixel region, and each sub-pixel region has one of the display controlling devices U1, U2, U3, U4, U5 or U6 disposed therein.

The display controlling device U1 includes an active device T1 and a pixel electrode P1, the display controlling device U2 includes an active device T2 and a pixel electrode P2, the display controlling device U3 includes an active device T3 and a pixel electrode P3, the display controlling device U4 includes an active device T4 and a pixel electrode P4, the display controlling device U5 includes an active device T5 and a pixel electrode P5, and the display controlling device U6 includes an active device T6 and a pixel electrode P6. The scan line SL1 is electrically connected to the actives T1~T6. The data line DL1 is electrically connected to the active device T1, the data line DL2 is electrically connected to the active device T2, the data line DL3 is electrically connected to the active device T3, the data line DL4 is electrically connected to the active device T4, the data line DL5 is electrically connected to the active device T5, and the data line DL6 is electrically connected to the active device T6. Moreover, the pixel electrode P1 is electrically connected to the active device T1 through the contact window C1, the pixel electrode P2 is electrically connected to the active device T2 through the contact window C2, the pixel electrode P3 is electrically connected to the active device T3 through the contact window C3, the pixel electrode P4 is electrically connected to the active device T4 through the contact window C4, the pixel electrode P5 is electrically connected to the active device T5 through the contact window C5, and the pixel electrode P6 is electrically connected to the active device T6 through the contact window C6. According to an embodiment, a common electrode line CL is further disposed under the pixel electrodes P1~P6, and the common electrode line CL, the pixel electrodes P1~P6 and a dielectric layer disposed between the common electrode line CL and the pixel electrodes P1~P6 form a plurality of storage capacitors.

The second substrate 104 is disposed opposite to the first substrate 102. The second substrate 104 may be a color filter substrate and comprises a color filter layer and an electrode layer (not shown). The second substrate 104 may also only have an electrode layer thereon.

The multi-sensing structure 106 is disposed between the first substrate 102 and the second substrate 104, and the multi-sensing structure 106 includes a sensing upper electrode 106a and a first multi-sensing lower electrode including a plurality of first sensing lower electrodes 106b. The sensing upper electrode 106a is disposed on the second substrate 104. The first sensing lower electrodes 106b are electrically connected in series and disposed on the first substrate 102.

For details, the sensing upper electrode 106a on the second substrate 104 comprises a sensing spacer 108 and an upper electrode layer 110 covering the sensing spacer 108. The upper electrode layer 110 is the above mentioned electrode layer formed on the second substrate 104.

The first sensing lower electrodes 106b on the first substrate 102 comprises a plurality of stacked pads S1~S5 and a lower electrode layer E covering the surfaces of the stacked pads S~S5, and each of the stacked pads S1~S5 and lower electrode layer E disposed thereon form one of the first sensing lower electrodes 106b. The stacked pads S1~S5 are formed by stacking metal layer(s), insulating layer(s), semiconductor layer(s), metal oxide layer(s) or a combination thereof during forming the display controlling devices U1~U5. In addition, because the lower electrode layer E continuously covers the surfaces of the stacked pads S1~S5, the first sensing lower electrodes 106b composed of the stacked pads S1~S5 and the lower electrode layer E covering the stacked pads S1~S5 are electrically connected to each other in series. More specifically, there are first sensing gaps G1~G5 between the sensing upper electrode 106a and the first sensing lower electrodes 106b, and the first sensing gaps G1~G5 have different distances.

In the embodiment, each of the stacked pads S1~S5 is disposed in one of the sub-pixel regions. That is, the stacked pads S1~S5 respectively correspond to the pixel electrodes P1~P5. Furthermore, the stacked pads S1~S5 have different heights, such that the lower electrode layer E covering the stacked pads S1~S5 has different heights, and thereby the first sensing gaps G1~G5 between the sensing upper electrode 106a and the first sensing lower electrodes 106b have different distances.

It is noted that the structure of the first substrate 102, the structure of the second substrate 104 and the multi-sensing structure 106 shown in FIG. 1 and FIG. 2 form a pixel structure, and therefore the pixel structure of the embodiment is constituted by six display controlling devices U1~U6 and one multi-sensing structure 106. The multi-sensing structure 106 has five first sensing lower electrodes 106a, and thus the multi-sensing structure 106 of this embodiment has five sensing gaps G1~G5. However, the present invention does not limit the number of the display controlling devices, the number of the first sensing lower electrodes and the number of the sensing gaps of each pixel structure.

According to the embodiment, the multi-sensing structure 106 further comprises an active sensing read out device T and a sensing signal line L, as shown in FIG. 2. The active sensing read out device T comprises a gate G, a source S, a drain D and a channel CH, and the drain D of the active sensing read out device T is electrically connected to the first sensing lower electrodes 106b through the contact window C. That is, the drain D of the active sensing read out device T is electrically connected to the lower electrode layer E of the first sensing lower electrodes 106b through the contact window C. In the embodiment, the sensing signal line L is parallel to the data lines DL1~DL6, and the sensing signal line L and the data lines DL1~DL6 are in the same layer. The sensing signal line L is electrically connected to the source S of the active sensing readout device T. The gate G of the active sensing readout device T is electrically connected to the scan line SL2.

Figure 3:
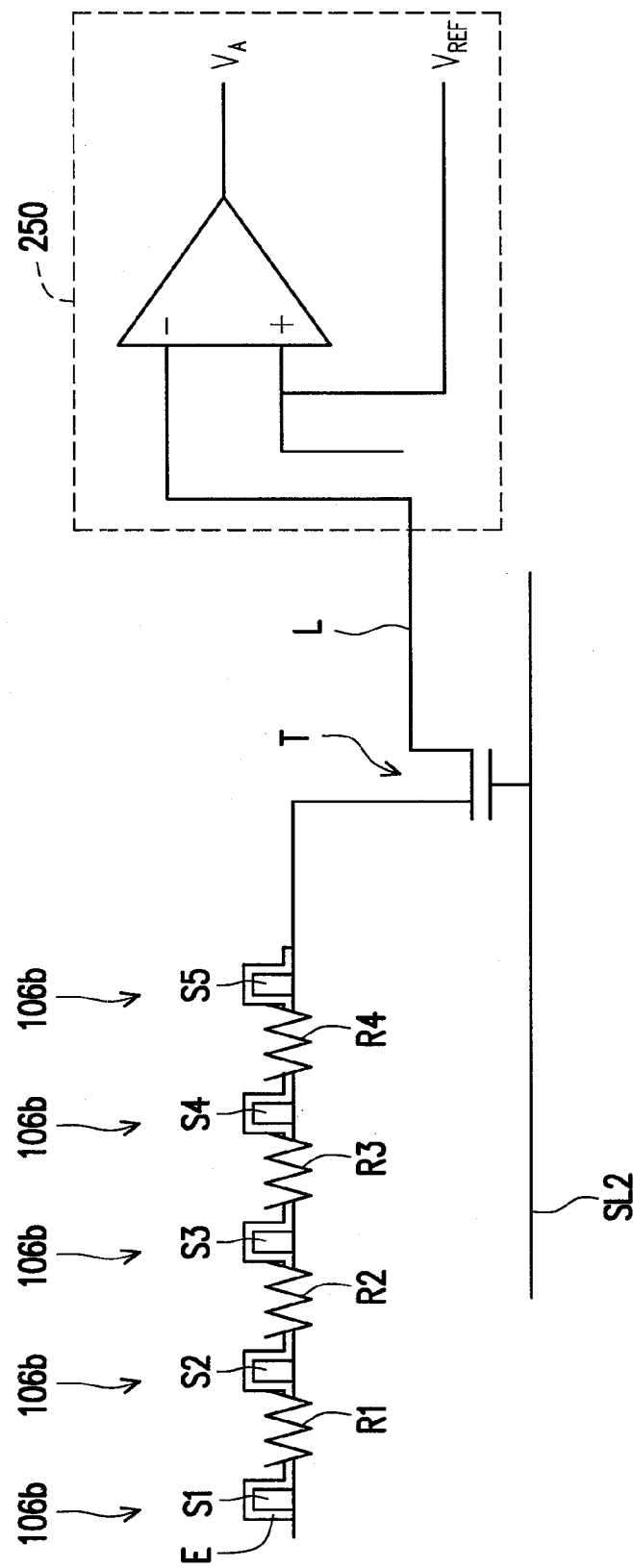
FIG. 3 is an equivalent circuit diagram of the first sensing lower electrodes, the active sensing readout device and the sensing signal line of the multi-sensing structure in FIG. 2.

In the embodiment, the equivalent circuit diagram of the first sensing lower electrodes 106b, the active sensing readout device T and the sensing signal line L of the multi-sensing structure 106 is shown in FIG. 3. Referring to FIG. 3, the lower electrode layer E continuously covers the stacked pads S1~S5, such that the first sensing lower electrodes 106b composed of the stacked pads S1~S5 and the lower electrode layer E covering the stacked pads S1~S5 are electrically connected to each other in series. In particular, a resistor R1, R2, R3 or R4 is further disposed between two of the adjacent first sensing lower electrodes 106b. A variable resistor structure is formed by using the stacked pads S1~S5 and the resistors R1~R4. Moreover, the lower electrode layer E of the first sensing lower electrodes 106b is electrically connected to the active sensing read out device T, and the sensing signal line L is electrically connected to the active sensing read out device T. The sensing signal line L is further electrically connected to a controlling circuit 250. The sensitivity or intensity of the first sensing signals on the first sensing lower electrodes 106b can be adjusted by the controlling circuit 250 through the resistors R1~R4.

As shown in FIG. 1 and FIG. 2, in the embodiment, the distances of the first sensing gaps G1~G5 are gradually reduced from near the active sensing readout device T to far away the active sensing readout device T. Therefore, G1<G2<G3<G4<G5.

Moreover, the display medium 150 of the touch display panel in the embodiment is between the first substrate 102 and the second substrate 104. The display medium 150 generates display effect according to the display controlling devices U1~U6 on the first substrate 102. The display medium 150 can be a liquid crystal material, an electro-luminescent material or an electrophoresis material, but not limited therein. It is well known for a person skilled in the art, and does not described in detail herein.

In the embodiment of FIG. 1 and FIG. 2, the first sensing lower electrodes 106b of the multi-sensing structure 106 in the touch display panel have different heights, such that the first sensing gaps between the first sensing lower electrodes 106b and the sensing upper electrode 106a have different distances. However, according to another embodiment, another design is used to achieve the first sensing gaps between the first sensing lower electrodes 106b and the sensing upper electrode 106a having different distances.

Figure 4:
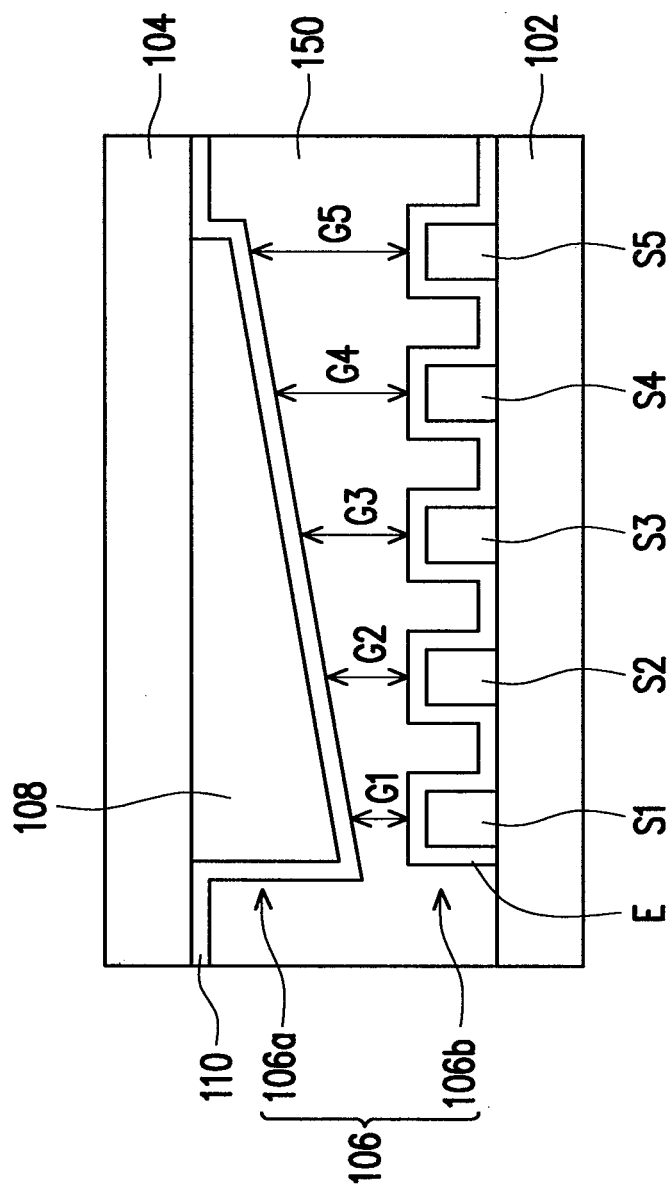
FIG. 4 is a cross-sectional view illustrating a portion of a touch display panel according to an embodiment of the present invention.

FIG. 4 is a cross-sectional view illustrating a portion of a touch display panel according to another embodiment of the present invention. The embodiment of FIG. 4 is similar to the embodiment of FIG. 1 and FIG. 2, and thus components identical to those of FIG. 1 and FIG. 2 will be denoted with the same numerals in FIG. 4 and not repeated herein. The difference between the embodiment of FIG. 4 and the embodiment of FIG. 1 and FIG. 2 is that the sensing upper electrode 106a of FIG. 4 has a various thickness, such that the first sensing gaps G1~G5 between the sensing upper electrode 106a and the first sensing lower electrodes 106b have different distances. In details, in the embodiment of FIG. 4, the sensing spacer 108 has a slanted surface, such that the thickness of the sensing spacer 108 is linearly increased from a side of the sensing spacer 108 to another side of the sensing spacer 108. Since the upper electrode 110 uniformly covers the surface of the sensing spacer 108, the thickness of the sensing upper electrode 106a composed of the sensing spacer 108 and the upper electrode 110 is also linearly increased from a side of the sensing upper electrode 106a to another side of the sensing upper electrode 106a.

Figure 5:
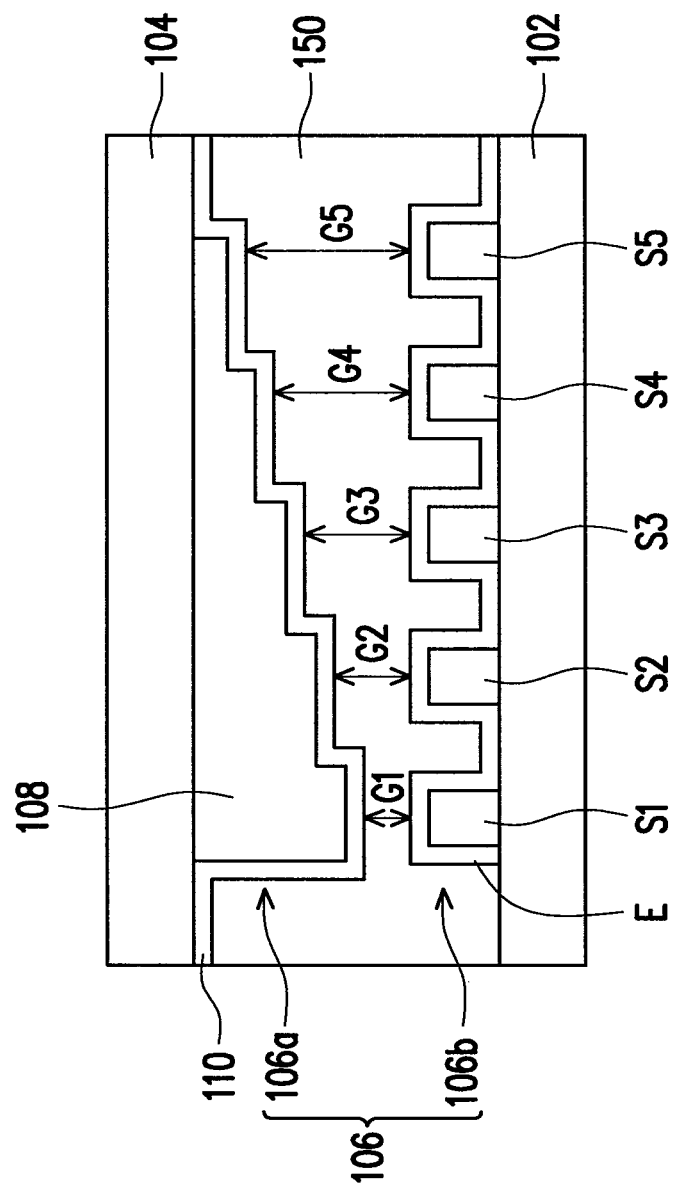
FIG. 5 is a cross-sectional view illustrating a portion of a touch display panel according to an embodiment of the present invention.

FIG. 5 is a cross-sectional view illustrating a portion of a touch display panel according to another embodiment of the present invention. The embodiment of FIG. 5 is similar to the embodiment of FIG. 1 and FIG. 2, and thus components identical to those of FIG. 1 and FIG. 2 will be denoted with the same numerals in FIG. 5 and not repeated herein. The difference between the embodiment of FIG. 5 and the embodiment of FIG. 1 and FIG. 2 is that the sensing upper electrode 106a of FIG. 5 has a various thickness, such that the first sensing gaps G1~G5 between the sensing upper electrode 106a and the first sensing lower electrodes 106b have different distances. In details, in the embodiment of FIG. 5, the sensing spacer 108 has a stepped surface, such that the thickness of the sensing spacer 108 is stepped-increased from a side of the sensing spacer 108 to another side of the sensing spacer 108. Since the upper electrode 110 uniformly covers the surface of the sensing spacer 108, the thickness of the sensing upper electrode 106a composed of the sensing spacer 108 and the upper electrode 110 is also stepped-increased from a side of the sensing upper electrode 106a to another side of the sensing upper electrode 106a.

In the above embodiments, the multi-sensing structure in the touch display panel uses the active sensing read out device T and the sensing signal line L to output the signals on the first sensing lower electrodes 106b into the control circuit 250, as shown in FIGS. 1~3. However, the present invention does not limit to this embodiment. According to another embodiment, another device is used to output the signals on the first sensing lower electrodes of the multi-sensing structure into the control circuit.

Figure 6A:
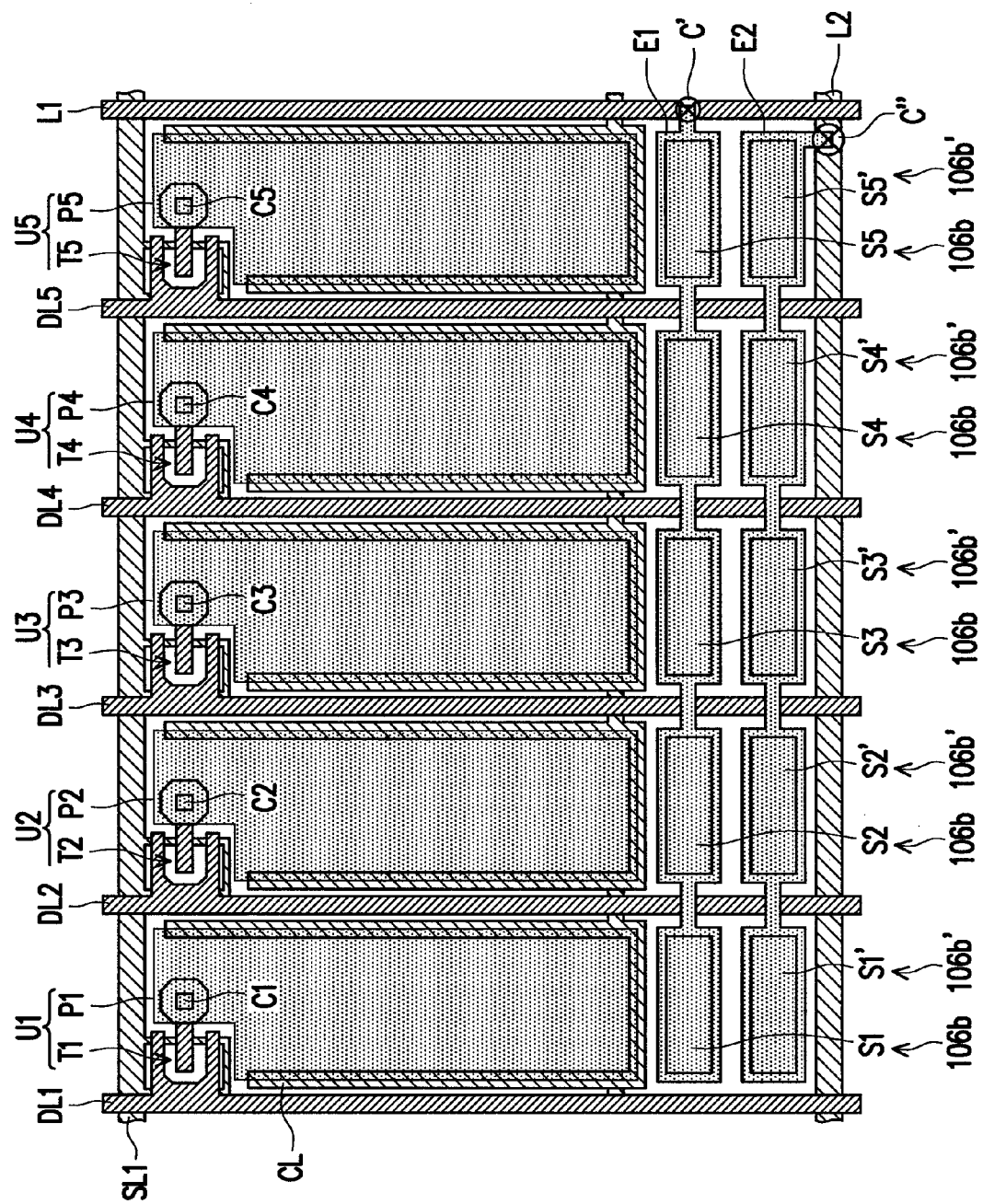
FIG. 6A is a partial top view of a first substrate of a touch display panel according to another embodiment of the present invention.
Figure 6B:
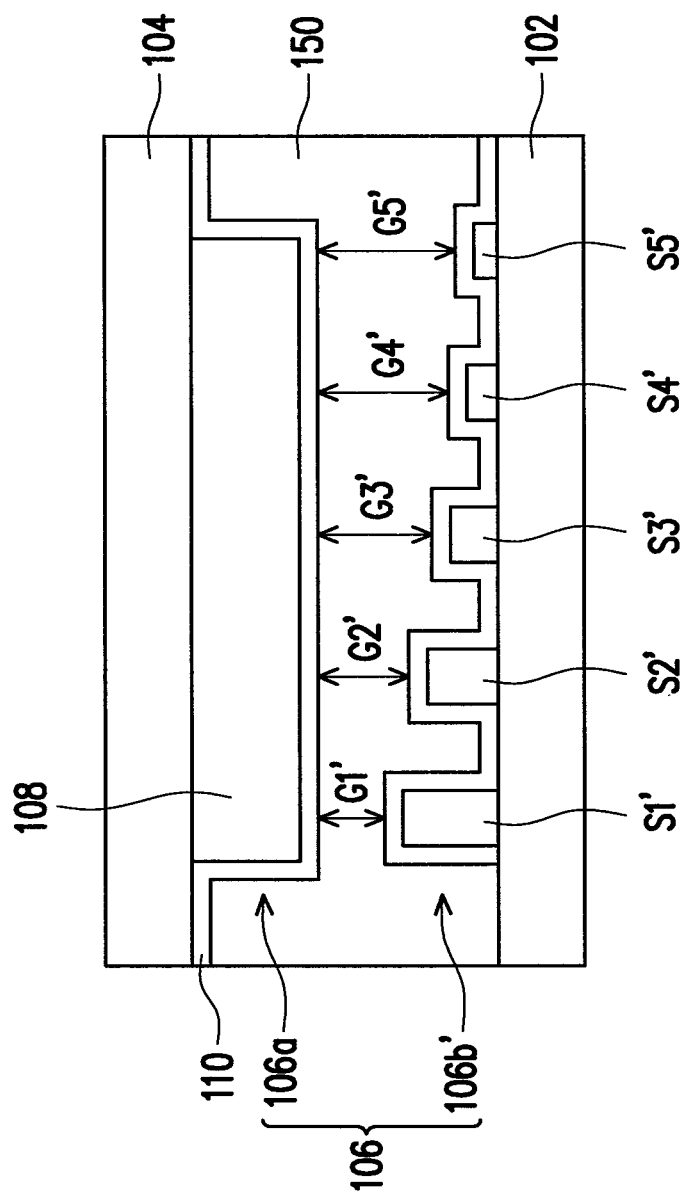
FIG. 6B is a schematic partial cross-sectional view of the touch display panel in FIG. 6A.

FIG. 6A is a top view illustrating a portion of the first substrate of the touch display panel according to another embodiment of the present invention. FIG. 6B is a cross-sectional view illustrating a portion of the touch display panel of FIG. 6A, and the cross-sectional view of FIG. 6B is corresponding to FIG. 6A in which second sensing lower electrodes of a multi-sensing structure is disposed. The embodiment shown in FIG. 6A is similar to the embodiment shown in FIG. 2 so that components identical to those of FIG. 2 will be denoted with the same numerals in FIG. 6A and not repeated herein. The difference between the embodiment of FIG. 6A and the embodiment of FIG. 2 is that the sensing lower electrodes of the multi-sensing structure of FIG. 6A comprises a plurality of first sensing lower electrodes 106b and a plurality of second sensing lower electrodes 106b'. The first sensing lower electrodes 106b are constituted by a plurality of stacked pads S1~S5 and a lower electrode layer E1, and the lower electrode layer E1 continuously covers the surfaces of the stacked pads S1~S5, such that the first sensing lower electrodes 106b are electrically connected to each other in series. The second sensing lower electrodes 106b' are constituted by a plurality of stacked pads S1'~S5' and a lower electrode layer E2. The lower electrode layer E2 continuously covers the surfaces of the stacked pads S1'~S5', such that the second sensing lower electrodes 106b' are electrically connected to each other in series.

More specifically, there are second sensing gaps G1'~G5' between the sensing upper electrode 106a on the second substrate 104 and the second sensing lower electrodes 106b', and the second sensing gaps G1'~G5' have different distances, as shown in FIG. 6B. Similarly, there are first sensing gaps G1~G5 between the sensing upper electrode 106a on the second substrate 104 and the first sensing lower electrodes 106b, and the first sensing gaps G1~G5 have different distances, as shown in FIG. 1. According to a preferred embodiment, the first sensing gaps G1~G5 are respectively identical to the second sensing gaps G1'~G5'. That is, G1=G1', G2=G2', G3=G3', G4=G4', G5=G5'.

In addition, the numbers of the first sensing lower electrodes 106b and the second sensing lower electrodes 106b' of the multi-sensing structure in FIG. 6A are respectively five, but the present invention does not limit the number of the first sensing lower electrodes 106b and the number the second sensing lower electrodes 106b'. According to an embodiment, the number of the first sensing lower electrodes 106b (the stacked pads S1~S5) and the number of the second sensing lower electrodes 106b' (the stacked pads S1'~S5') are the same, and the first sensing lower electrodes 106b (the stacked pads S1~S5) and the second sensing lower electrodes 106b' (the stacked pads S1'~S5') are arranged correspondingly.

In the embodiment, the multi-sensing structure 106 further comprises a first sensing line L1 and a second sensing line L2, as shown in FIG. 6A. The first sensing line L1 is electrically connected to the lower electrode layer E1 of the first sensing lower electrodes 106b. The second sensing line L2 is electrically connected to the lower electrode layer E2 of the second sensing lower electrodes 106b'. For details, the first sensing line L1 is electrically connected to the lower electrode layer E1 of the first sensing lower electrodes 106b through the contact window C'. The second sensing line L2 is electrically connected to the lower electrode layer E2 of the second sensing lower electrodes 106b' through the contact window C".

Moreover, in the multi-sensing structure 106 of FIG. 6A and FIG. 6B, the second sensing gaps G1'~G5' are gradually reduced from near the second sensing signal line L2 to far away the second sensing signal line L2. Therefore, G1'<G2'<G3'<G4'<G5'. Similarly, the first sensing gaps G1~G5 are gradually reduced from near the first sensing signal line L1 to far away the first sensing signal line L1. Therefore, G1<G2<G3<G4<G5.

It is noted that the second sensing lower electrodes 106b' of the multi-sensing structure 106 of FIG. 6A and FIG. 6B have different heights, such that the second sensing gaps G1'~G5' between the second sensing lower electrodes 106b' and the sensing upper electrode 106a have different distances. According to another embodiment, the sensing upper electrode 106a and the second sensing lower electrodes 106b' of the multi-sensing structure 106 may also be designed as FIG. 4 or FIG. 5, so as to achieve the second sensing gaps G1'~G5' between the second sensing lower electrodes 106b' and the sensing upper electrode 106a having different distances.

According to the aforementioned embodiments, the multi-sensing structure has a plurality of sensing gaps between the sensing lower electrodes and the sensing upper electrode, and the sensing gaps have different distances. Therefore, the number of the sensing lower electrodes contacting with the sensing upper electrode is varied according to the touch pressure. Therefore, the sensing sensitivity of the touch display panel can be adjusted based on the measured sensing signals, so as to improve the quality of the touch display panel.

Figure 7A:
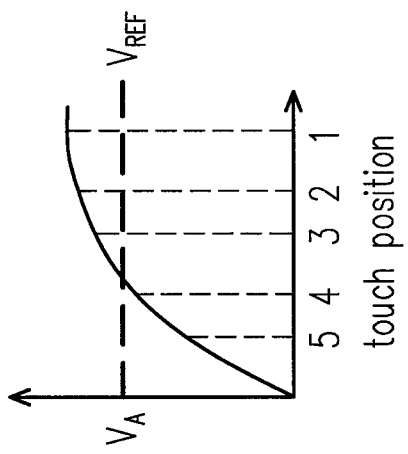
FIGS. 7A~7C show touch sensing voltage curves of touch display panels according to embodiments of the present invention.
Figure 7B:
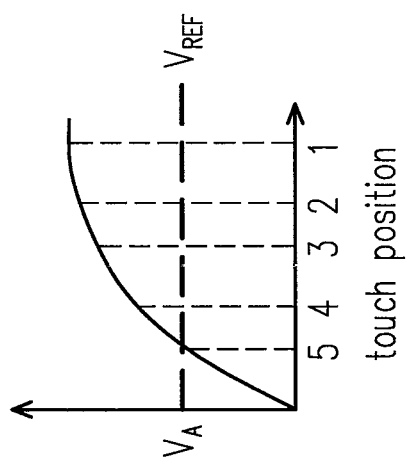
Figure 7C:
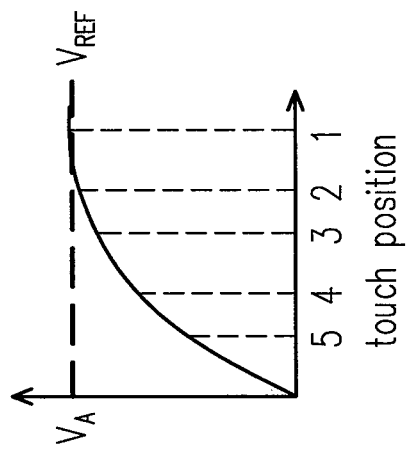

FIGS. 7A~7C show touch sensing voltage curves of touch display panels according to embodiments of the present invention. In FIGS. 7A~7C, X axis represents the touch position of one of multi-sensing structures, and the touch positions 1~5 respectively correspond to the positions of the sensing lower electrode 106b on the stacked pads S1~S5 of FIG. 2 or FIG. 6. Y axis represents the voltage.

The touch sensing voltage curve of FIG. 7A shows the sensing gap of the touch display panel meets the standard.

If the sensing gaps of the touch display panel have lower sensitivity because of the process quality or variation and a larger touch pressure is required to perform a touch operation, the reference voltage ($V_{REF}$) is adjusted to low by the controlling circuit, as shown ion FIG. 7B. Thereby, the touch sensing sensitivity is increased, and the touch pressure can be reduced when performing the touch operation.

If the sensing gaps of the touch display panel have excessively high sensitivity because of the process quality or variation and a touch operation is induced when a lower or excessively low touch pressure is applied, the reference voltage ($V_{REF}$) is adjusted to high by the controlling circuit, as shown ion FIG. 7C. Thereby, the touch sensing sensitivity is reduced, so as to increase the required touch pressure when performing the touch operation.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch display panel, comprising:
a first substrate;
a second substrate;
a plurality of scan lines and a plurality of data lines, disposed on the first substrate;
a plurality of multi-sensing structures, arranged in an array and disposed between the first substrate and the second substrate, and each of the multi-sensing structures comprising:
a sensing upper electrode, disposed on the second substrate;
a plurality of first sensing lower electrodes, disposed on the first substrate and the first sensing lower electrodes being electrically connected to each other in series, wherein a plurality of first sensing gaps are between the first sensing lower electrodes and the sensing upper electrode, and the first sensing gaps have different distances; and
an active sensing read out device, electrically connected to one of the scan lines correspondingly and the active sensing read out device being electrically connected to the first sensing lower electrodes; and
a sensing signal line, electrically connected to the active sensing readout device, wherein the active sensing readout device comprises a transistor having a gate, a source and a drain, the gate of the transistor is directly connected to one of the scan lines, the source of the transistor is electrically connected to the sensing signal line, and the drain of the transistor is electrically connected to the first sensing lower electrodes;
a display medium, sandwiched between the first substrate and the second substrate; and a plurality of display controlling devices, disposed on the first substrate and each of the display controlling devices being electrically connected to one of the scan lines and one of the data lines correspondingly for controlling the display medium.

2. The touch panel as claimed in claim 1, wherein the distances of the first sensing gaps are gradually reduced from near the active sensing readout device to far away the active sensing readout device.

3. The touch display panel of claim 1, further comprising a resistor between the first sensing lower electrodes so as to adjust first sensing signals sensed by the first sensing lower electrodes.

4. The touch display panel of claim 1, wherein the multi-sensing structure comprises a plurality of stacked pads disposed under the first sensing lower electrodes, such that the first sensing lower electrodes have different heights so as to form the first sensing gaps having different distances between the sensing upper electrode and the first sensing lower electrodes.

5. The touch display panel of claim 1, wherein the multi-sensing structure comprises a sensing spacer disposed between the second substrate and the sensing upper electrode, such that the sensing upper electrode has different heights so as to form the first sensing gaps having different distances between the sensing upper electrode and the first sensing lower electrodes.

6. The touch display panel of claim 5, wherein the sensing spacer has a slanted surface such that the sensing upper electrode has a thickness which is linearly increased from a side of the sensing upper electrode to another side of the sensing upper electrode, or has a stepped surface such that the sensing upper electrode has a thickness which is stepped-increased from a side of the sensing upper electrode to another side of the sensing upper electrode.

7. The touch display panel of claim 1, wherein the touch display panel has a plurality of sub-pixel regions, and each of the first sensing lower electrodes is disposed in one of the sub-pixel regions.

8. The touch display panel of claim 1, wherein each of the multi-sensing structures is disposed between two of the scan lines which are adjacent to each other.

* * * * *